Oct. 3, 1967     JEAN-LOUIS BARNABE ETAL     3,344,926
DEVICE FOR UTILIZING THE OSMOTIC PRESSURE OF A SOLUTION
FOR THE PRODUCTION OF MECHANICAL ENERGY
Filed April 25, 1966     3 Sheets-Sheet 1

United States Patent Office 3,344,926
Patented Oct. 3, 1967

3,344,926
DEVICE FOR UTILIZING THE OSMOTIC PRESSURE OF A SOLUTION FOR THE PRODUCTION OF MECHANICAL ENERGY
Jean-Louis Barnabe, Noisy-le-Sec, Dominique Callies, Neuilly-sur-Seine, and Christian Leveque, Paris, France, assignors to Société de Recherches Techniques et Industrielles (S.R.T.I.), Paris, France
Filed Apr. 25, 1966, Ser. No. 545,145
Claims priority, application France, May 6, 1965, 16,146; Feb. 9, 1966, 49,033
9 Claims. (Cl. 210—321)

ABSTRACT OF THE DISCLOSURE

A vessel having an internal fluid tight deformable partition defining two variable volume cavities therein each cavity being filled with selected solutions and having a zone of communication with the exterior of the vessel closed off by at least one semi-permeable porous membrane, osmotic pressure within the first cavity causing the deformable partition to reduce the volume of the second cavity to produce reverse osmosis across the membrane of the second cavity.

This invention relates to the utilization of the osmotic pressure of a solution for the production of mechanical energy, one of the main applications of which is of particular interest, being the conversion of sea water or saline solutions to fresh water by reverse osmosis.

The invention is also concerned with a device whereby appreciable quantities of fresh water can be produced by means of a simple and rugged apparatus which is of light weight and small overall size and which is especially suitable for use as a survival unit by shipwrecked persons.

The theory of the phenomenon of osmosis or preferential exchange which takes place through porous walls or barriers is well known both by experiment and calculation. It is thus known that the interposition of a barrier of this type between two liquids, one of which is a solvent in a practically pure state and the other is a binary compound of said solvent and of a substance which is dissolved in this latter, results in a double diffusion which tends to eliminate the dissymmetry of the system by equalizing the concentrations on each side of the barrier. The dissolved substance diffuses towards the pure solvent while a part of the molecules of this latter has a tendency to pass through the porous barrier. However, in certain cases, it does happen that the velocity of passage of the dissolved substance through the porous barrier is zero; such a barrier accordingly constitutes a membrane or semi-permeable wall. Under these conditions, there only takes place a transfer of solvent towards the solution of the dissolved substance, thus producing a higher hydrostatic pressure on the solution side which progressively increases until the moment when the pressure difference on each side of the semi-permeable wall attains a sufficient value to prevent the passage of the solvent towards the solution. Equilibrium is thus achieved inasmuch as the hydrostatic pressure in the solution is equal to what is known as the osmotic pressure.

The present invention mainly consists in utilizing said osmotic pressure of a first solution for the purpose of causing a second solution to work in reverse osmosis by counter-balancing the effects of the osmotic pressure of said second solution.

A device of the present invention is characterized in that it comprises a vessel provided with an internal fluid-tight and deformable partition which delimits two cavities having variable volumes, each cavity comprising a zone of communication with the exterior of said vessel which is closed off by means of at least one semi-permeable porous membrane and means for filling and emptying the cavities with given solutions, the osmotic pressure within the first cavity being such as to cause the deformable partition to work in the direction of a reduction in volume within the second cavity by producing reverse osmosis across the membrane which closes off said second cavity.

In a preferred form of embodiment, the first cavity is filled with a supersaturated saline solution while the corresponding closure membrane is in contact with a continuous flow of sea water, the second cavity being also filled with sea water in such a manner that a reverse osmosis takes place across the membrane which closes off said second cavity and thus causes the production of fresh water from sea water.

An apparatus of this type can readily be designed to have a small overall size and a weight which is very appreciably lower than that of the volume of fresh water which is produced, the process of production being semi-continuous and extremely simple, thus requiring only a minimum amount of supervision. The apparatus therefore offers particularly remarkable advantages within the scope of the application for which it is chiefly intended, namely as an apparatus for survival at sea.

A better understanding of the invention will in any case be gained from the following complementary description in which a number of examples of construction are given without any limitation being implied, reference being had to the accompanying drawings, in which.

Figure 1:
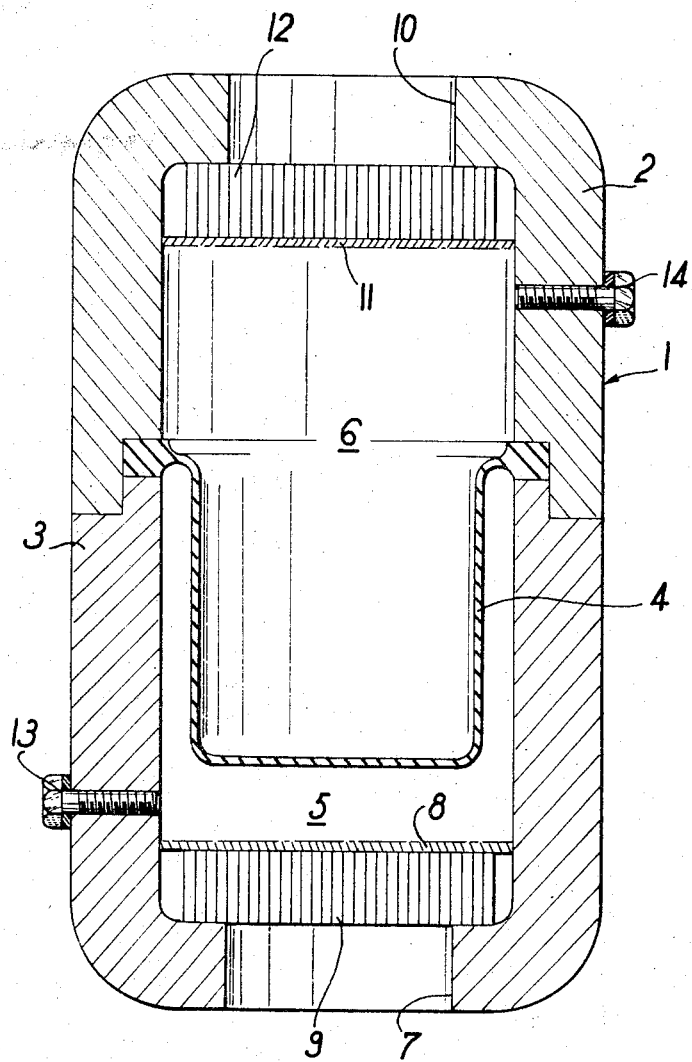
FIG. 1 is a diagrammatic sectional view of a device for the production of fresh water from sea water as constructed in accordance with the invention.

From FIG. 1, it can be seen that the device comprises a vessel 1 made up of two parts 2 and 3 which are placed end to end and joined together by any suitable means (not shown), said vessel being capable of withstanding very high pressures of up to 200 bars. Between the two sections 2 and 3 of the vessel 1 is stationarily fixed an internal partition 4 formed of a highly deformable material such as natural rubber in order that the pressures exerted on each face of said partition should be transmitted into the cavities 5 and 6 which are delimited by said partition within the vessel 1. The partition is fixed in position by any suitable means in such a manner as to ensure a strictly leak-tight separation between said cavities 5 and 6.

An opening 7 is formed in the vessel 1 on the same side as the cavity 5 and is closed off by a membrane 8 which rests on a porous support 9. The membrane 8 is a semi-permeable membrane which can be formed of cellulose acetate or any other suitable material. Provision is made at the other end of the vessel 1 and in oppositely-facing relation to the opening 7 for a second opening 10, the corresponding cavity 6 being closed off by a membrane 11 which rests on a support 12, said membrane and said support being identical with those which were previously designated by the reference 8 and 9. Finally, the device is completed by plugs 13 and 14 for closing ducts or the like which terminate respectively in the cavities 5 and 6, said ducts being provided for permitting the introduction into or withdrawal from these cavities of the solutions which are necessary for the operation of the apparatus.

The operation of said apparatus is as follows: a supersaturated sodium chloride solution, namely a solution containing approximately 350 g. of NaCl per liter of water at ambient temperature, is fed into the cavity 5, the partition 4 being placed as shown in FIG. 1 in such a manner that the cavity 5 has minimum capacity. After having closed said cavity 5 in leak-tight manner by means of its plug 13, sea water is fed into the other cavity 6 and this cavity is sealed off by means of its plug 14, while ensuring that no air is trapped in either of the two cavities.

When these operations have been completed, the opening 7 of the vessel 1 is contacted with a continuous flow of sea water. From that moment, there accordingly takes place an osmosis which causes the sea water to flow towards the cavity 5 through the membrane 8, thus tending to equalize the concentrations of sodium chloride on each side of the membrane. The pressure within the cavity 5 increases until it reaches the value of the osmotic pressure for the salt solution in the cavity. It should be noted that, as has been mentioned earlier, the membrane 8 must be continuously swept by sea water in order to prevent any impairment of permeability which may otherwise be caused by deposition of salt in the region which is located outside the vessel 1. The source of water under pressure which is thus provided within the cavity 5 causes the partition 4 to work in such a manner as to produce a variation in the volume of the cavity 6 and within this latter a back pressure which produces across the membrane 11 a reverse osmosis of the sea water contained in said cavity 6. Said reverse osmosis initiates the passage through the membrane of fresh water alone which is collected through the opening 10 of the vessel 1. On completion of the operation and in the case of suitable dimensions of the vessel 1 and of the cavities 5 and 6, the partition 4 takes up a position such that the volume of the cavity 6 is at a minimum value while that of the cavity 5 is at a maximum value.

The cycle is then stopped by removing the plugs 13 and 14 and rinsing the cavity 6. The partition 4 is then replaced in its initial position while withdrawing from the cavity 5 the quantity of saline solution which is necessary. There is then added in said cavity a small quantity of NaCl which is dissolved therein and which brings back the concentration of the solution to 350 g./l. A further cycle of fresh water production can then be commenced.

The device hereinabove described in its most schematic form can be improved to an appreciable extent with a view to increasing the useful surface area of the membranes in respect of the same volume of the apparatus and also with a view to ensuring that, by means of a judicious distribution of said membranes and their supports, there can thus be achieved a better renewal of the solutions which are in contact therewith as well as higher resistance to the pressure differences to which they are subjected.

Figure 2:
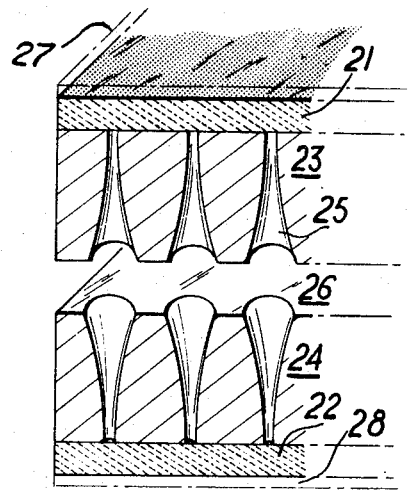
FIG. 2 is a diagrammatic view in perspective of a first form of embodiment contemplated for the assembly of porous membranes which are intended to close off either of the two cavities.

With these objects in mind, there is shown in FIG. 2 a first possible arrangement for the assembly of two porous membranes 21 and 22 which are capable of being associated with each other as shown in the drawing. Said membranes are parallel to each other and each attached to supports which are respectively designated by the reference numerals 23 and 24. Each support is preferably formed by means of a fine-mesh nickel grid which is constructed by electrophotoforming, each membrane being attached to the corresponding support by means of a cellulose glue. As an advantageous feature, each support is provided within its thickness with through passages 25 having a flared shape. There is formed between the two supports a space 26 which is reserved for the continuous circulation of a solution, while the membranes are in contact with a second solution and are thus caused to work either in direct osmosis or reverse osmosis, depending on the nature of the solutions employed, the value of the pressure which is exerted on each of the faces of the membranes and the mode of assembly of said membranes in the device of FIG. 1.

Broadly speaking, the porous membranes 21 and 22 are in contact with the solution which has the highest hydrostatic pressure, which has the advantage of ensuring the close application of said membranes against their supports. In the previous arrangement, the space 26 which is formed between the two parallel supports 23 and 24 has very uniform geometrical dimensions in order that the flow of solution within said space is also distributed, thereby preventing any difference in concentration which would impair the recovery of the energy of dissolution. Said space 26 is nevertheless very narrow, with the result that effective renewal of the solution produces a substantial pressure drop. Under these conditions, it is necessary to make a choice which results from a compromise between the energy to be supplied and the energy which is collected by the application of the phenomenon of osmosis. As an alternative form, it would be possible to employ, insted of two parallel supports, a single support which is provided on both faces with two membranes, provision being made for channels which are cut in the central portion of said support, said channels being uniformly distributed and of sufficiently large number to permit of uniform circulation of the solution through said support.

Finally, in the case which is more particularly considered in which the porous membranes are employed in the device of FIG. 1 for the production of fresh water from sea water, said membranes can be covered with slabs or layers of salt 27 and 28 for the purpose of maintaining the concentration of said solution at its maximum value when said membranes are in contact with the supersaturated saline solution (that is to say when they are placed in the position occupied by the membrane 8 in the previous form of embodiment).

Figure 3:
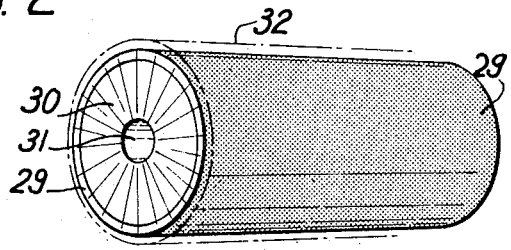
FIG. 3 illustrates an alternative form of the assembly of FIG. 2.

FIG. 3 illustrates an alternative form in which the porous membrane 29 is designed in the form of a tubular element which is fixed on a support 30. Said support is provided with an axial bore 31 for circulating a solution therethrough, while the membrane 29 is in contact with another solution. Preferably, and as in the case of FIG. 2, the membrane 9 is in contact with the solution which has the highest hydrostatic pressure. It should be noted that the construction of a cylindrical support offers certain advantages, especially insofar as it affords a better resistance to the pressure difference which is exerted on each side of its faces. A support of this type can advantageously be formed by means of a sintered and porous ceramic material. The membrane can be covered, as in the case of FIG. 2, with a layer 32 of salt, especially in the form of a compacted powder. The presence of the axial bore makes it possible to reduce the pressure drop which is necessary for the effective renewal of the solution which circulates therein, a compromise having to be adopted also between the value of said pressure drop and the thickness of the boundary layer which forms in the flow through the axial bore. Finally, it should be noted that the utilization of a membrane 29 in tubular form provides a maximum useful surface area for a minimum overall size.

Figure 4:
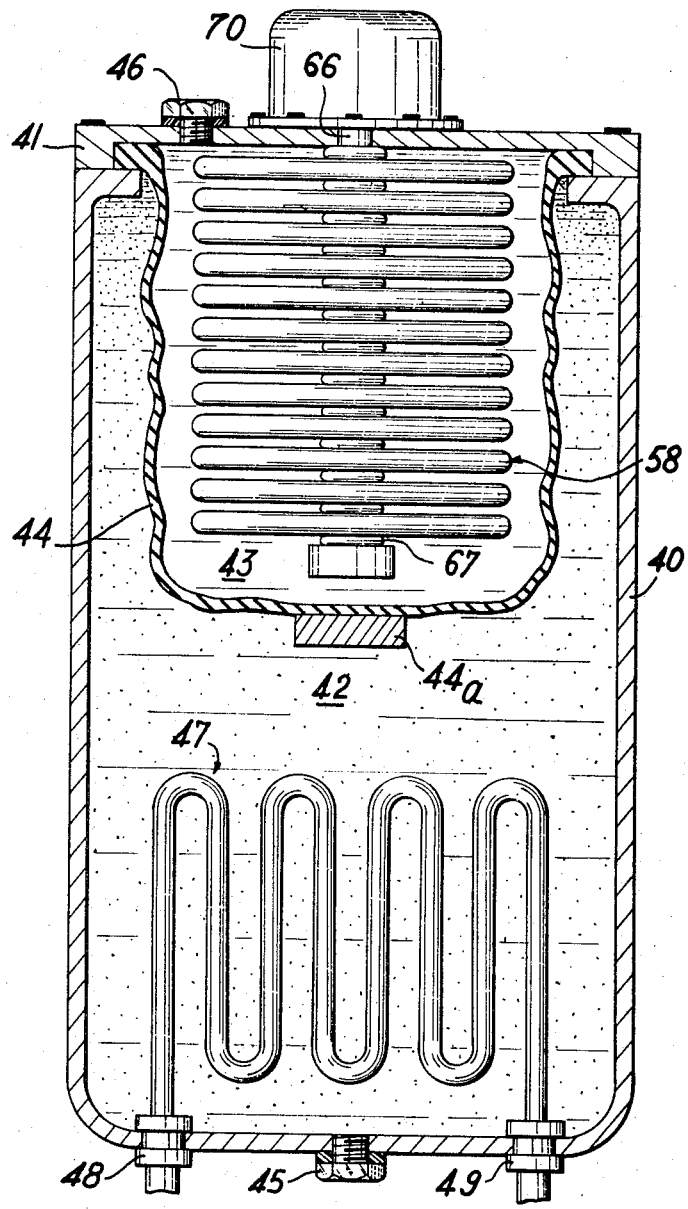
FIG. 4 is a sectional view of an improved alternative form of FIG. 1.

FIG. 4 illstrates the application of to types of membrane described above to the device of FIG. 1 for the production of fresh water. In this figure, there is shown diagrammatically at 40 the vessel of the device which is closed at the top by a cover 41, the interior of said vessel being separated into two cavities 42 and 43 by a deformable partition 44 which may be fitted if necessary with a weight 44a so as to increase its inertia. The top end of said partition is clamped between the wall of the vessel 40 and the cover 41, thereby ensuring perfect leak-tightness between the two cavities 42 and 43. Plugs 45 and 46 make it possible to gain access to the interior of these cavities so as to proceed to the emptying or filling with suitable solutions, as has been described in connection with FIG. 1.

There is mounted within the cavity 42 a snaked coil 47, the ends of which are connected through leak-tight passages 48 and 49 formed through the wall of the vessel 40 to a pump or the like for the continuous circulation of sea water through the coil 47.

Figure 5:
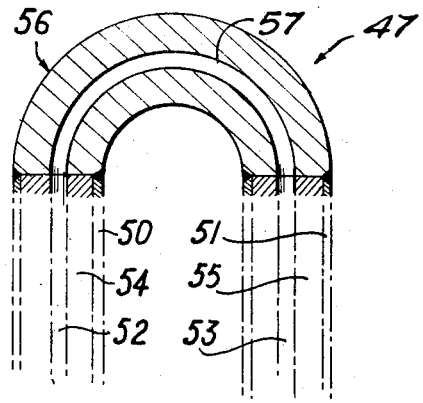
FIGS. 5 and 6 are views on a larger scale and showing details of FIG. 4.

From FIG. 5, it can be seen that said coil is made up of a series of tubular membranes such as the membranes 50 and 51 which are identical with those which have been described in reference to FIG. 3. The axial bores such as the bores 52 and 53 which are formed at the centers of the supports 54 and 55 of said membranes communicate with each other at their extremities. Said extremities are joined to each other by means of a coupling member 56 which is provided with a central bore 57 and joined in leak-tight manner on the one hand to the membranes and, on the other hand, to the supports either by bonding or by any other suitable mode of attachment.

The continuous passageway which is formed by the axial bores 52 and 53 on the one hand and 57 on the other hand is reserved for the circulation of sea water while the tubular membranes 50, 51 are in contact with the supersaturated saline solution which is contained within the cavity 52. Advantageously, the surface area of the membranes 50, 51 which is in contact with said solution is covered with a layer of salt in compacted form (not shown) which maintains the concentration within the cavity 52 at its maximum value.

Figure 6:
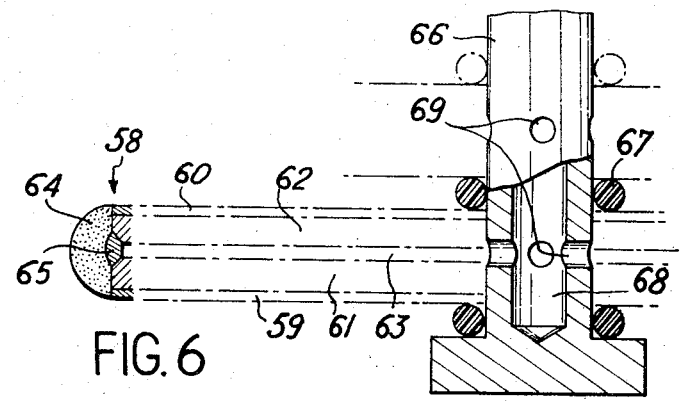

Within the cavity 53 which is located on the other side of the deformable partition 54, there is mounted a stack 58 of membranes in the form of flat layers which are similar to those described in reference to FIG. 2. As can be seen from FIG. 6, each assembly of two membranes 59 and 60 and associated supports 61 and 62 which delimit an intermediate space such as the space 63 is closed at its extremities by means of a member 64 which is bonded and welded. Both supports are welded together at 65, thus sealing off the space 63 at that point. Each assembly is then mounted on a shaft 66 which is provided with longitudinal splines and the extremity of which is made integral with the cover 41 of the vessel 40. An O-ring seal 67 is fitted between each assembly so as to ensure leak-tightness with the shaft 66. Said shaft is provided internally with an axial duct 68 into which open via ports 69 the intermediate spaces 63 which are provided between the supports 61 and 62. Suitable registry of the ports 69 with the spaces 63 is ensured by virtue of the longitudinal splines formed on the shaft 66 which permit of correct positioning of the membranes on said shaft. Inside the cavity 43, the membranes 59 and 60 of each assembly are in contact with sea water. Said membranes work in reverse osmosis and produce within the spaces 63 a quantity of fresh water which is collected in the duct 68, then in a reservoir 70 which is attached to the cover 41.

One of the advantages of the device of FIG. 4 lies in the fact that it is no longer essential to adjust the salt content of the first solution at the end of each production cycle by virtue of the presence of layers of solid salt in the form of compacted powder on the membranes of the first cavity, inasmuch as said layers continuously maintain the concentration of the solution at its desired value. It can be noted that, after each cycle, the displacement of the intermediate partition increases to a certain extent which corresponds to the dissolution of the salt within the first cavity, thereby resulting in a more substantial variation in the volume of the second cavity, therefore in an increase in production of fresh water which is collected at the outlet of the apparatus.

It will be understood that the invention is not limited in any sense to the examples of construction which have been more especially contemplated hereinabove. In particular, the semi-permeable membranes could have shapes other than those which have been described which would serve to provide a maximum area of passage for a minimum overall size.

What we claim is:
1. A device comprising a vessel, an internal fluid tight and deformable partition in said vessel, two cavities having variable volumes formed by said partition in said vessel, a zone of communication with the exterior of said vessel for each of said cavities, at least one semi-permeable porous membrane closing each of said zones and means for filling and emptying said cavities with given solutions, means causing osmosis across the membrane of a first one of said cavities for increasing the pressure in said first cavity to cause said deformable partition to move in the direction of a reduction in volume of the other of said cavities to produce reverse osmosis across said membrane of said other of said cavities.

2. A device as described in claim 1, said first cavity being filled with a supersaturated saline solution and said membrane for said first cavity being in contact with a continuous flow of sea water and said other cavity being filled with sea water whereby a reverse osmosis takes place across said membrane of said other cavity and produces fresh water from sea water in said other cavity.

3. Device as described in claim 1, said membranes being flat layers fixed on a support and associated in pairs parallel to each other with their supports in oppositely facing relation and a space between said supports for the circulation of a solution.

4. Device as described in claim 3, said supports being grids and transverse bores in said grids disposed at right angles to the corresponding ones of said membranes.

5. Device as described in claim 1, said membrane being tubular elements mounted on cylindrical supports and an axial bore in said supports for circulating a solution therethrough.

6. Device as described in claim 5, said cylindircal supports being a sintered porous ceramic material.

7. Device as described in claim 5, including a plurality of tubular membranes on cylindrical supports connected in series in said first cavity, said bores in said supports providing a continuous passageway for the circulation of sea water and a stack of membranes in said other cavity arranged in pairs in flat layers and in contact with sea water filling said other cavity, a support for each of said membranes in said stack and a space between said supports for each of said pairs of membranes, each of said spaces being isolated from said other cavity, a duct, said spaces opening into said duct and a reservoir connected to said duct for receiving fresh water.

8. Device as described in claim 1, including supports for said membranes, said membranes being in contact with a solution having a hydrostatic pressure which is higher than that of a solution in contact with the associated one of said supports.

9. Device as described in claim 1, one of said membranes being covered with an excess of a substance dissolved in said solution contacting said membrane, said substance being a layer of salt when said solution is a supersaturated saline solution.

References Cited

UNITED STATES PATENTS 3,156,645   11/1964   Chapin et al. _____ 210—321 X

REUBEN FRIEDMAN, *Primary Examiner.*

F. SPEAR, *Assistant Examiner.*